US006755555B2

(12) United States Patent
Bloom et al.

(10) Patent No.: US 6,755,555 B2
(45) Date of Patent: Jun. 29, 2004

(54) AUXILIARY ILLUMINATING DEVICE HAVING AN ADJUSTABLE COLOR TEMPERATURE BY CONTROLLING THE AMOUNT OF LIGHT PASSING THROUGH COLOR FILTERS

(75) Inventors: Daniel M Bloom, Loveland, CO (US); Mark J Bianchi, Fort Collins, CO (US); Robert E. Sobol, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/061,466

(22) Filed: Jan. 31, 2002

(65) Prior Publication Data

US 2003/0142496 A1 Jul. 31, 2003

(51) Int. Cl.[7] .................................................. F21V 9/00
(52) U.S. Cl. .......................... 362/293; 362/5; 362/321; 362/281; 362/283
(58) Field of Search ................................ 362/3, 5, 260, 362/319, 293, 321, 280, 281, 282, 283

(56) References Cited

U.S. PATENT DOCUMENTS

| 4,459,014 A | * | 7/1984 | Thebault ...................... 355/32 |
| 4,894,760 A | * | 1/1990 | Callahan ..................... 362/293 |
| 4,978,892 A | | 12/1990 | Petrakos et al. ............ 315/358 |
| 5,045,983 A | * | 9/1991 | Shields ........................ 362/293 |
| 5,109,248 A | | 4/1992 | Petrakos et al. ............ 354/413 |
| 5,550,587 A | | 8/1996 | Miyadera ..................... 348/223 |
| 5,803,579 A | * | 9/1998 | Turnbull et al. ........... 362/83.1 |
| 5,851,063 A | | 12/1998 | Doughty et al. ............ 362/231 |
| 5,896,014 A | * | 4/1999 | Ogawa et al. .............. 315/241 |
| 6,102,554 A | * | 8/2000 | Wynne Willson et al. .. 362/281 |
| 6,234,645 B1 | | 5/2001 | Borner et al. ............... 362/231 |
| 2002/0006264 A1 | * | 1/2002 | Birk et al. ................... 385/147 |
| 2002/0060911 A1 | * | 5/2002 | Brockmann et al. ........ 362/321 |

* cited by examiner

Primary Examiner—Stephen Husar
Assistant Examiner—Sharon Payne
(74) Attorney, Agent, or Firm—Steven L. Webb

(57) ABSTRACT

An auxiliary illuminating device that has an adjustable color temperature. The color temperature is adjusted by varying the light throughput of independently adjustable color filters.

12 Claims, 7 Drawing Sheets

AUXILIARY ILLUMINATING DEVICE HAVING AN ADJUSTABLE COLOR TEMPERATURE BY CONTROLLING THE AMOUNT OF LIGHT PASSING THROUGH COLOR FILTERS

FIELD OF THE INVENTION

The present invention relates generally to cameras and more specifically to an auxiliary illuminating device that has an adjustable color temperature.

BACKGROUND OF THE INVENTION

When capturing an image with a digital camera, the source of illumination for the scene affects the colors captured by the camera. For indoor scenes the illumination source can vary widely and can include a tungsten bulb, a halogen lamp, a fluorescent lamp, sunlight coming in through a window, or even a xenon light. Each of these light sources has a different spectral energy distribution. The type of light source that creates light using a filament glowing at a high temperature (for example tungsten bulbs) are typically characterized by a color temperature defined as a Planckian radiator with a temperature 50 degrees higher than the filament of the light (see FIG. 1). The sun can also be characterized as a Planckian radiator but the loss of some wavelengths through scattering and absorption in the atmosphere causes significant differences from the Plankian radiator at those wavelengths. Because of the variation in the spectral power distribution of the sun, standard spectral power distribution curves have been developed. One of the standard curves is called D65 having a color temperature of 6500 k (see FIG. 2). Clouds in the sky can also affect the spectral distribution of energy reaching the scene from the sun. The time of day also affects the color temperature of the sun (noon vs. sunrise). The color temperature can be affected by whether the object is in direct sun light or in shadow.

The type of light source that excites a phosphor layer that then fluoresces (for example fluorescent lamps) tend to have spectral distributions that are unique to the phosphors in the lamp (see FIG. 3) in combination with the mercury vapor spectrum.

Each of these light sources has a different spectral power distribution that affects the colors captured in a scene by a camera. For example when you have a white object illuminated by a tungsten bulb the white object will appear yellow in the scene captured by the camera (assuming the camera is calibrated for normal daylight like D65). This is because the tungsten bulb does not produce much blue light. A white object is an object that reflects an equal amount of the red, green and blue light that hits the object. When a white object is illuminated by a tungsten bulb more red light is hitting the object than blue light and therefore more red light is reflected, causing the object to look yellow to the camera. The human eye adjusts to different illuminates and compensates for the color shift but a camera records the actual light in the scene. Hence, a camera without color compensation, or incorrect compensation, would generate images which would be perceived as being "off color".

Fortunately these color shifts caused by the illumination source can be corrected. This correction is typically called white balancing. There are many methods currently used to try to adjust the image to the proper white point (see U.S. Pat. No. 6,038,399).

One method looks for the brightest point in a scene and assumes that it should be white. The brightest point is adjusted until it is white and then this adjustment is used to balance the rest of the scene. This method operates on the assumption that the brightest point in a scene is from a white object or from a specular reflection, for example, the specular reflection coming from a car windshield. Another method of white balancing adjusts the image until the sum of all the areas in the image adds up to a neutral gray. Both of these methods are typically applied to the entire scene.

Applying a white balancing algorithm to the entire scene can be a problem when a strobe or flash is used in capturing the image of a scene. When a strobe, or auxiliary illuminating device, is used to enhance the illumination of the scene, typically the strobe will not have the same color temperature as the ambient light in the scene. When a strobe is used, nearby objects are more strongly illuminated by the strobe than objects that are further away. Objects that have higher reflectivity may also appear to be more strongly illuminated by the strobe. The power or intensity of the strobe is typically angle dependent. This means that the strobe illuminates the center of the scene more strongly than the edges of the scene. This causes the total illumination color of each object in a scene to be dependent on the distance between the camera and the object, the angle between the object and the center of the scene and the difference in the color temperature of the ambient light and the color temperature of the strobe. This makes it difficult to correct the scene for the variation in the color temperature as a result of strobe illumination of the scene. If the color temperature of the strobe or flash could be adjusted to match the color temperature of the ambient light, then the entire scene could be corrected or white balanced. Therefore, there is a need for a system that can adjust the color temperature of the auxiliary illuminating device to match that of the scene.

SUMMARY OF THE INVENTION

An auxiliary illuminating device is disclosed that has an adjustable color temperature. The color temperature is adjusted by varying the amount of light from a broad-band light source that is transmitted through a number of color filters. The color filters could be an array of red, green, and blue filters.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENT

Figure 1:
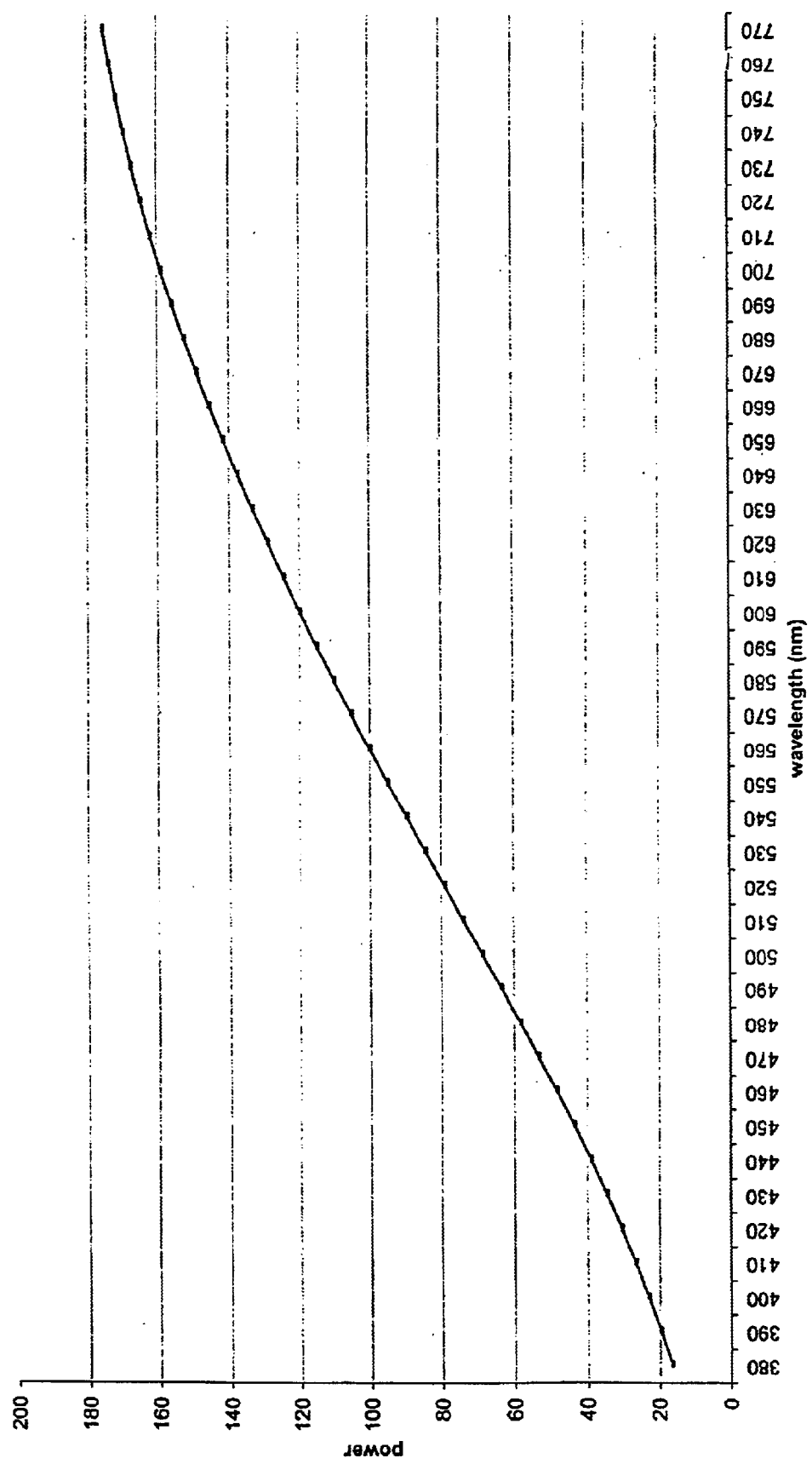
FIG. 1 is a chart of the spectral distribution of power for a tungsten bulb.
Figure 2:
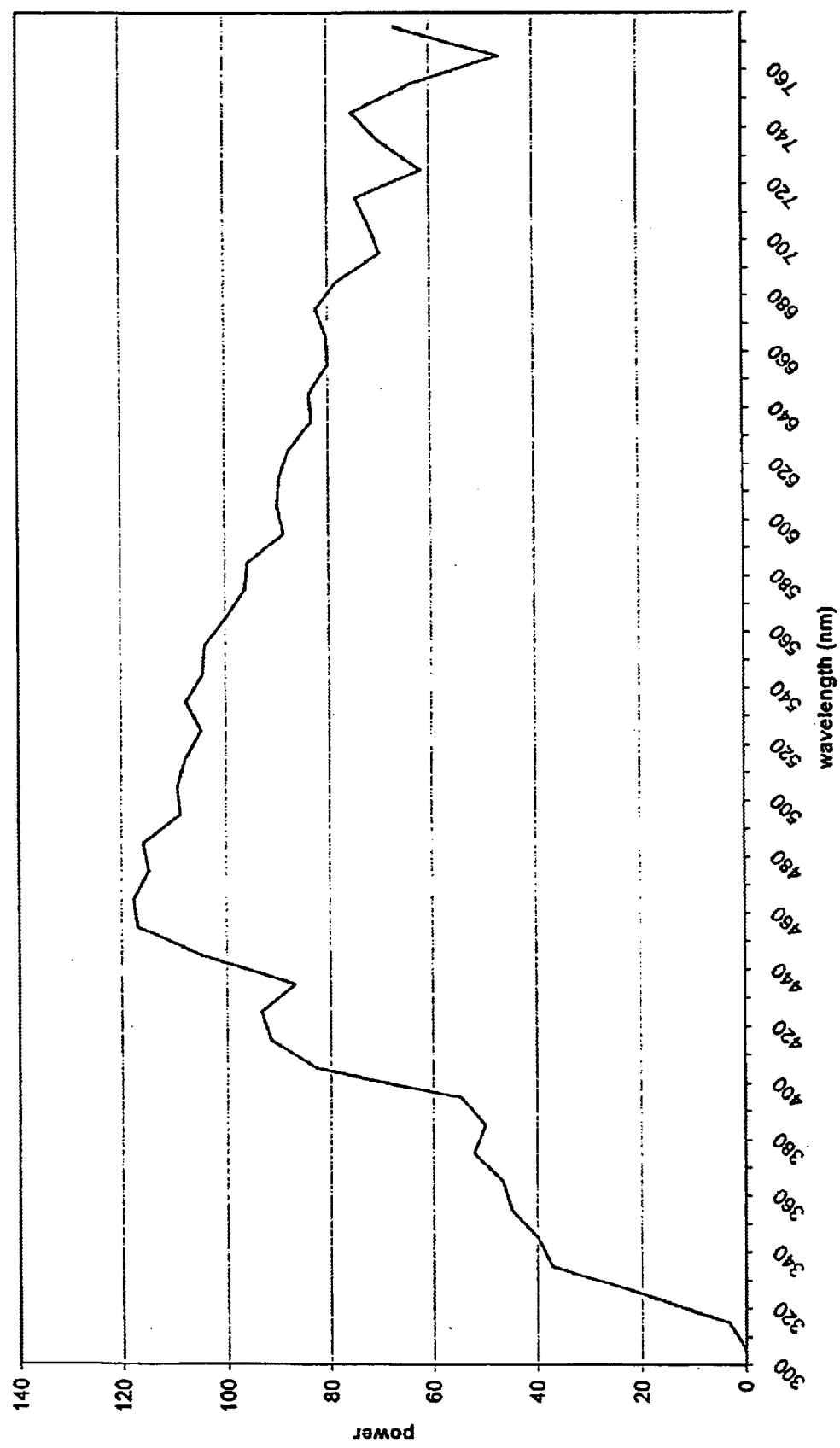
FIG. 2 is a chart of the spectral distribution of power for D65.
Figure 3:
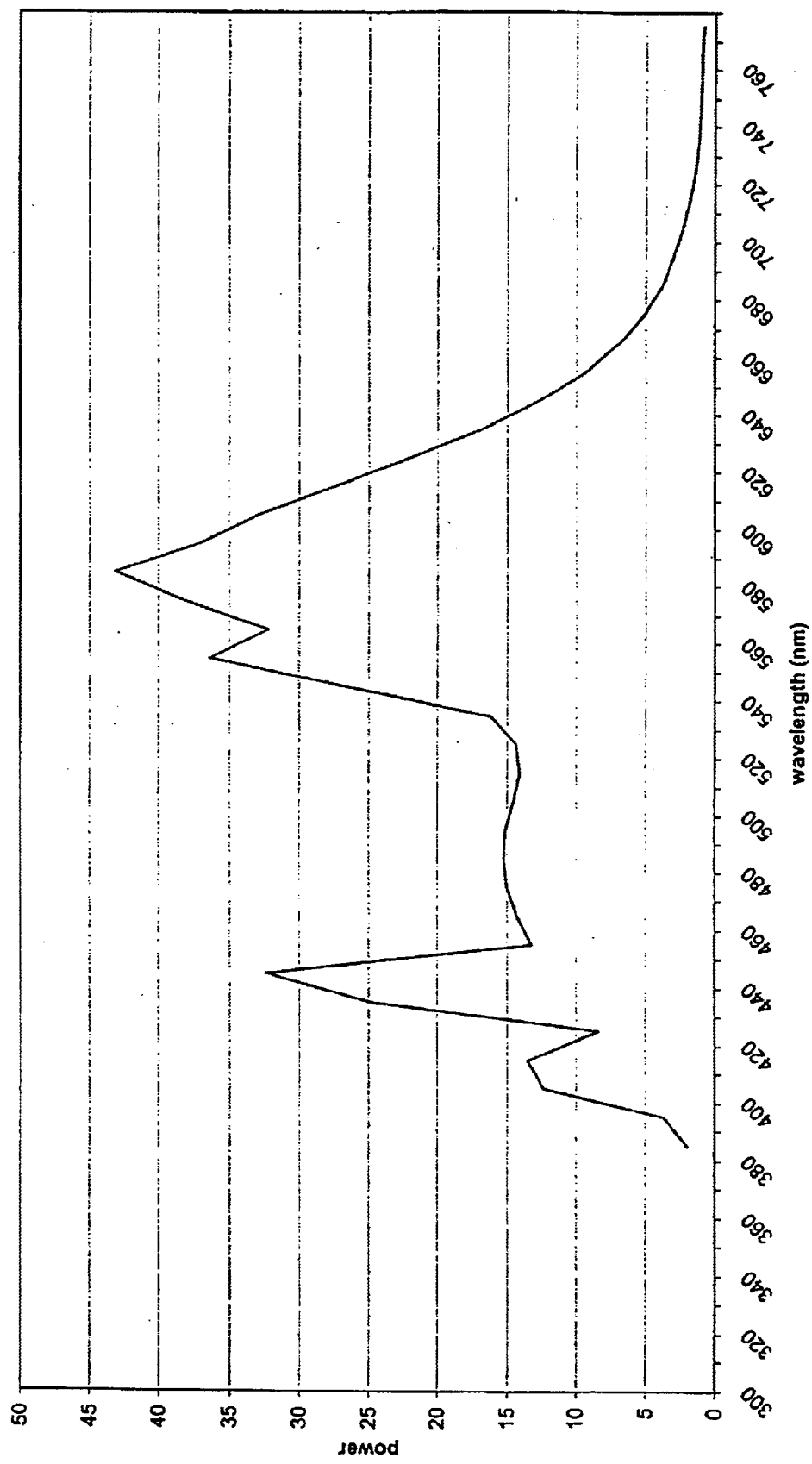
FIG. 3 is a chart of the spectral distribution of power for a fluorescent bulb.

A system that can adjust the color temperature of the auxiliary illuminating device used to help illuminate a scene greatly improves the color balancing of the captured scene.

One embodiment of the current invention comprises a broadband light source. The broadband light source can be a flash tube with multiple gases having different spectral outputs (see U.S. Pat. No. 4,978,892 "Variable color-output strobe"). The broadband source could also be an electric arc lamp, an incandescent bulb, a black body radiator, or the like. In one embodiment of the current invention, a color filter 402 is configured to cover at least part of the broadband light source 404. A shutter 406 is arranged to control the light passing through the color filter 402. The shutter can be anything that allows a variable amount of light from the broadband source to pass through the color filter, for example an adjustable mechanical slit. In the preferred embodiment, the shutter is a liquid crystal display (LCD). LCD's can be adjusted to allow a variable amount of light to pass through the LCD. Light ray 408 from the broadband source 404 is unchanged. Light ray 410 from the broadband source passes through the color filter 402 and through the shutter 406. By adjusting the amount of light allowed to pass through the color filter, the ratio of intensity between the non-filtered broadband light and the light passing through the filter can be adjusted. By adjusting the ratio of filtered to non-filtered light the color temperature of the light can be changed. For example, if the filter does not allow blue light to pass and the shutter is adjusted to maximize the amount of light passing through the filter, then the overall light will be shifted towards the red end of the spectrum. In one embodiment, the shutter completely overlaps the color filter and in other embodiment the shutter does not completely overlap the color filter. When the shutter does not completely overlap the color filter there is always some light from the broadband source passing through the color filter. Using only one color filter limits the range of color temperatures that can be chosen for the device.

Figure 5:
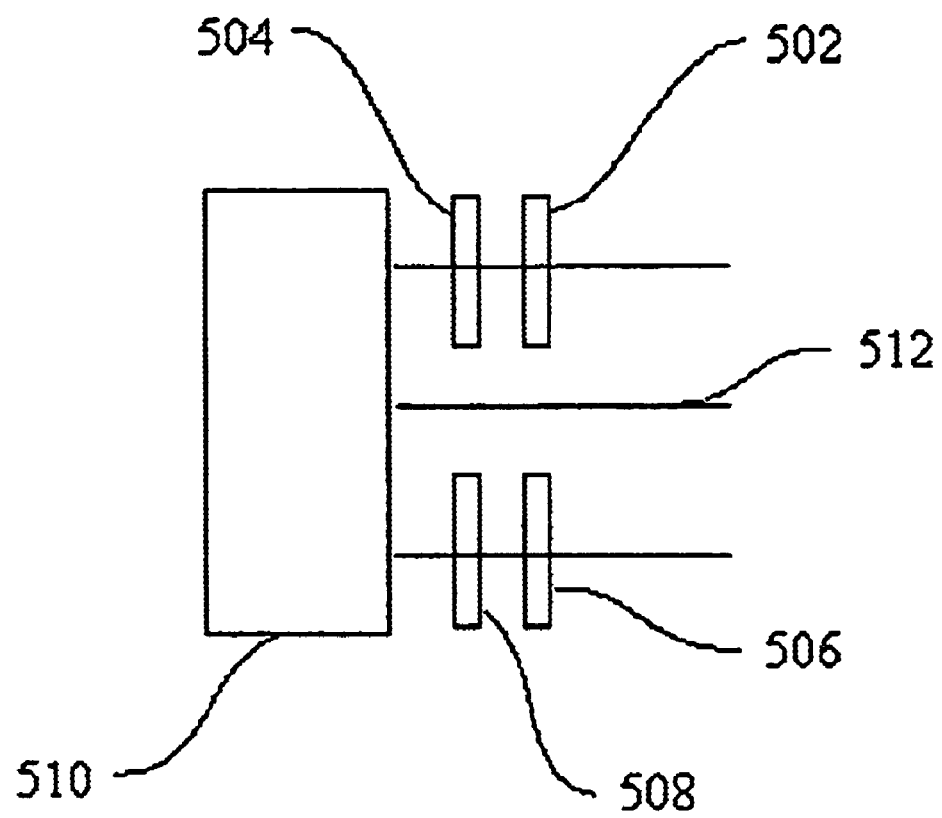
FIG. 5 is a drawing of an auxiliary illuminating device with a two color filters in accordance with the present invention.

In another embodiment, there are two different color filters (see FIG. 5). Shutter 504 adjusts a first color filter 502 and a second color filter 506 is adjusted using shutter 508. The two color filters would block different wavelengths or colors from the broadband source 510, for example one filter could be blue and the other filter could be red. In one embodiment, there is an area of the broadband source that is unfiltered allowing light ray 512 to be projected onto the scene to be illuminated. In another embodiment, the broadband light source is completely covered by the two filters (not shown). By adjusting the amount of light allowed to pass through the two color filters, the ratio of intensity between the non-filtered broadband light and the light passing through the filters can be adjusted. This allows the color temperature of the light source to be adjusted.

Figure 4:
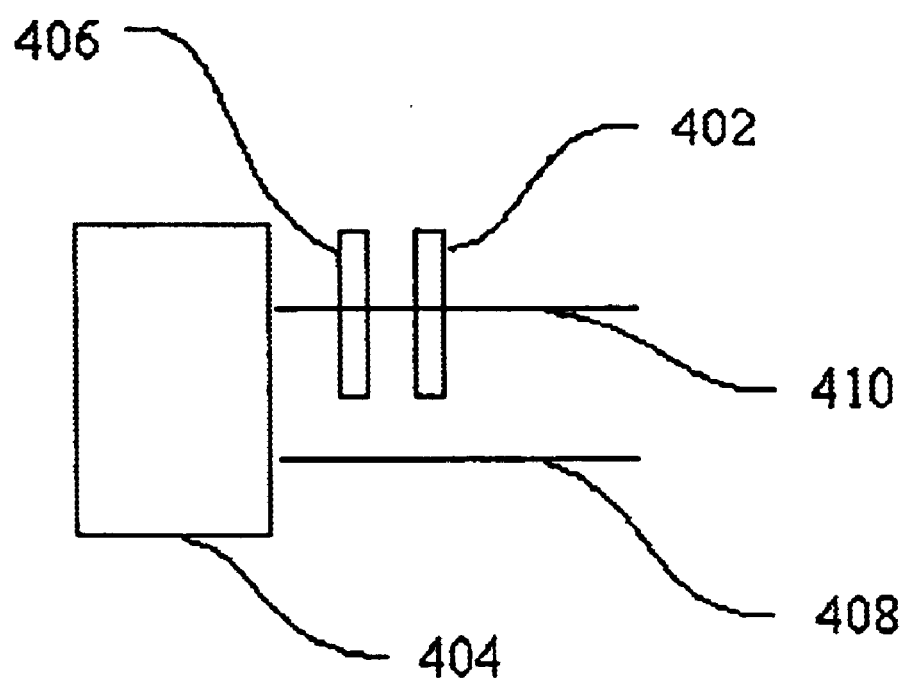
FIG. 4 is a drawing of an auxiliary illuminating device with a color filter in accordance with the present invention.
Figure 6:
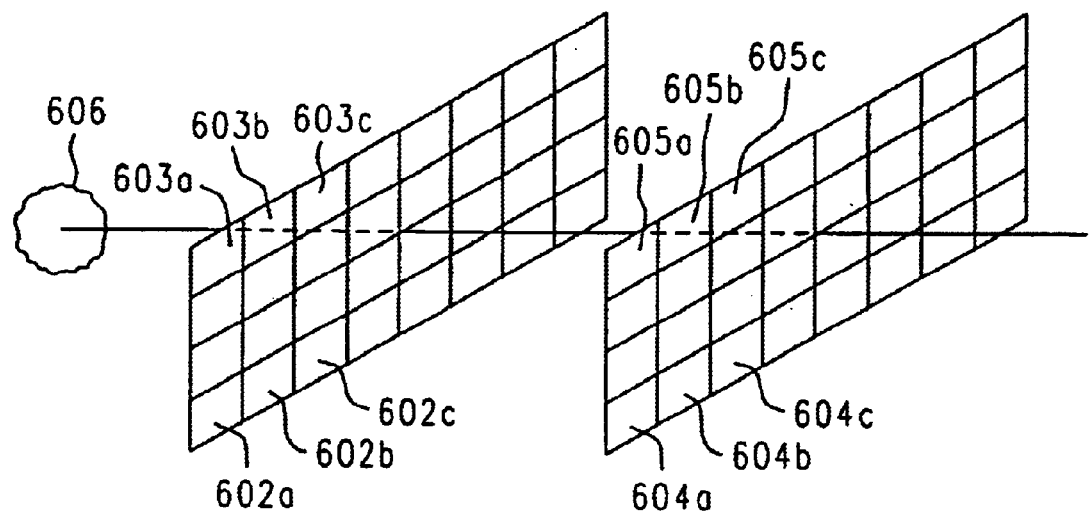
FIG. 6 is a drawing of an auxiliary illuminating device with a matrix of color filters in accordance with the present invention.
Figure 7:
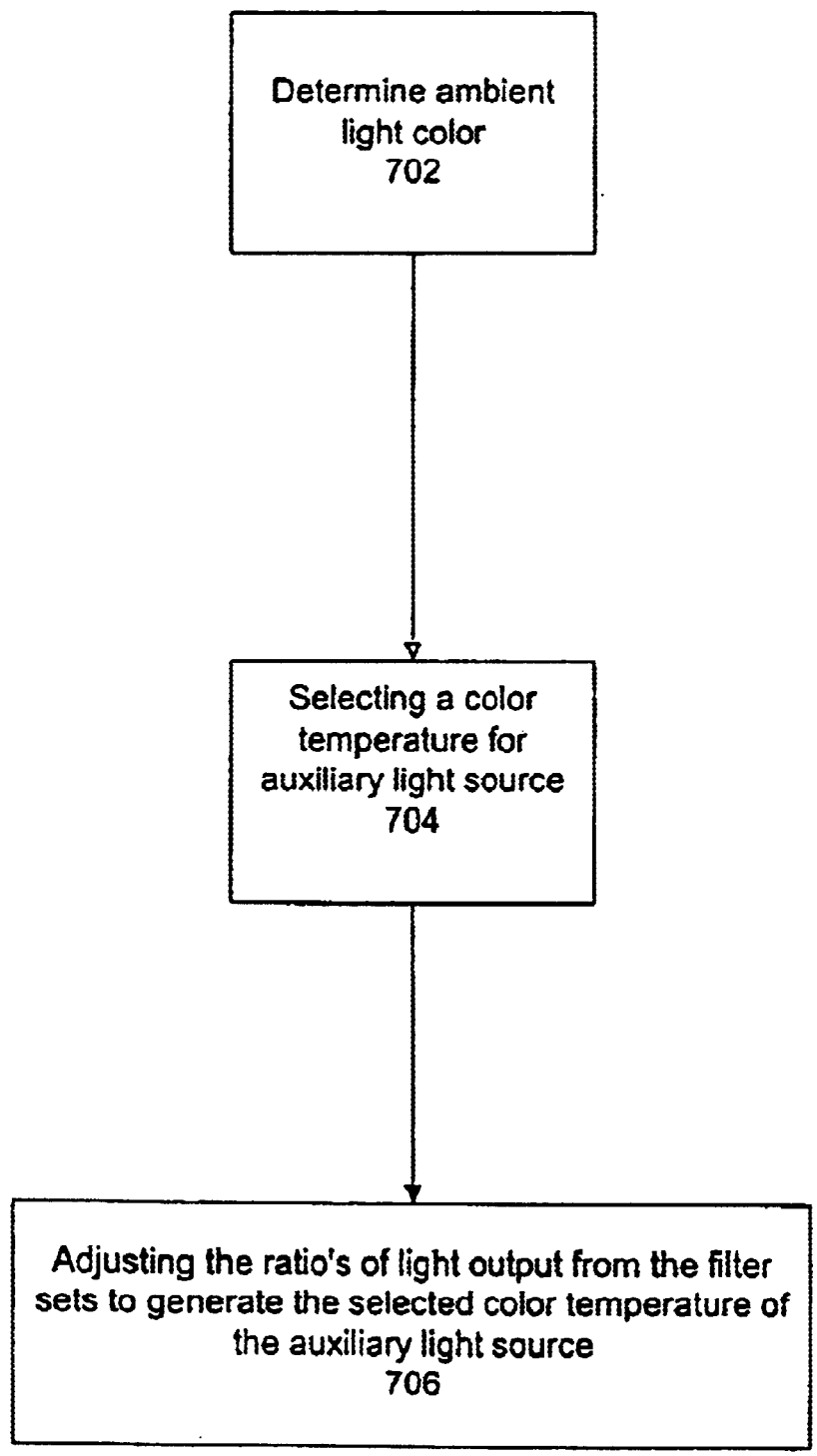
FIG. 7 is a flow chart of a method for adjusting the color temperature of a multi-element light source in accordance with the present invention.

FIGS. 4 and 5 show a filter as one large area. This configuration may cause non-uniform mixing of the filtered and unfiltered light. In another configuration the filter may be distributed across the area of the broadband-light source. FIG. 6 shows a grid or array of filters with a corresponding grid of shutters. Filter area 602a has corresponding shutter 604a that controls the amount of light passing through filter area 602a from the broadband light source 606. In one embodiment using this configuration, each of the filter areas would have the same color filter. In another embodiment, there would be more than one color filter used in the array. With reference again to FIG. 6. the grid or array of filters may, for example, include filter areas 602a, 602b and 602c. Filter area 602a may be of a first color, filter area 602b of a second color different from the first color and filter area 602c of a third color different from both the first and second colors. The grid or array of filters may, for example, further include filter areas 603a, 603b and 603c. Filter area 603a may, for example, be of the first color, filter area 603b of the second color and filter area 603c of the third color as discussed above. Shutters 604a, 604b, 604c may correspond to each of the filter areas 602a, 602b, 602c, respectively. Shutters 605a, 605b, 605c may correspond to each of the filter areas 603a, 603b, 603c, respectively. As discussed below, the shutters may be either variable or only have an open and shut setting. The array shown in FIG. 6 is arranged in a square pattern for ease of description and in no way limits the invention to a square array. Other patterns may be used, for example a hexagonal array. In addition, the color filter need not be uniformly distributed across the array. When there is more than one color of filters, there may be a different numbers of areas for one color compared to other colors.

When there is only one large filter area (as shown in FIGS. 4 and 5), the shutter must be of the variable type, allowing a variable amount of light to pass through the shutter. When there are multiple filter areas, the shutters used may either be variable or only have an open or shut setting. With shutters having only an open or shut setting, varying the number of shutters that are either open or closed would control the amount of light passing through that color.

In one embodiment of the current invention, the array of filters has two different colors and has at least some areas of the array that do not contain filters, allowing unfiltered broadband light to pass through the array. In another embodiment, there are at least three different filter colors. The three colors can be red, green and blue. In another embodiment, the array of filters contain four colors, red, green, blue, and amber. All the filter areas of one color make up a set of filters. Each set of filters can be independently controlled so that the amount of light they transmit is controllable. When each set of filters is transmitting a predetermined ratio of light compared to the other sets of filters, the total light output from the filter array would be white.

For the array of filters to simulate the color temperature of the ambient light, the type of illumination to be matched must be known. One way to determine the type of illumination is for the user to select it from a list of choices. Another way is for the camera or an auxiliary device to measure the current light in the scene and determine the type of illumination. Once the type of illumination to be matched has been determined, the amount of light coming from each set of color filters can be adjusted such that the total amount of light coming from the filter array is a calorimetric match to the ambient illumination source. Each type of ambient light source would typically have a different ratio of light coming from the sets of color filters. In one embodiment of the current invention, the color of the ambient light would be determined 702. A color temperature for the auxiliary device would be selected that was the closest match available to the ambient light 704 and the ratio of light being transmitted by at least one color filter with respect to the broadband light source would be adjusted to generate the selected color temperature 706.

FIG. 1 shows the spectral power distribution for a tungsten bulb with a filament temperature of 3250K. The ratio of power for three color filters (for example red, green and blue filters) to match an ambient light source can be calculated with the following equations. Using standard colorimetric formulas (well know in the art), the chromaticity of the ambient light source can be calculated, for example $x_0=0.4202$ and $y_0=0.3976$ where $x_0$ and $y_0$ are the chromaticity coordinates of the ambient light source. Matching the given chromaticity coordinates can be done by determining the CIE tristimulus values X, Y, Z. The tristimulus values are calculated from the tristimulus functions $X(\lambda)$, $Y(\lambda)$, $Z(\lambda)$ and the total output power from the filter arrays. The power from the filter arrays is represented by the spectral output distribution of the three filter arrays $R(\lambda)$, $G(\lambda)$, $B(\lambda)$ and a multiplier for each array $E_1$, $E_2$, and $E_3$.

$$X=\int X(\lambda)(E_1 R_1(\lambda)+E_2 G(\lambda)+E_3 B(\lambda))d\lambda \quad \text{Equation 1}$$

$$Y=\int Y(\lambda)(E_1 R(\lambda)+E_2 G(\lambda)+E_3 B(\lambda))d\lambda \quad \text{Equation 2}$$

$$Z=\int Z(\lambda)(E_1 R(\lambda)+E_2 G(\lambda)+E_3 B(\lambda))d\lambda \quad \text{Equation 3}$$

where the integrals are evaluated over the visible spectrum (for example 350 nm to 780 nm) and from these equations the chromaticity coordinates of the filter arrays can be calculated as:

$$y = \frac{Y}{X+Y+Z} \quad \text{Equation 4}$$

$$x = \frac{X}{X+Y+Z} \quad \text{Equation 5}$$

Because we are interested in the relative power of each filter set, we can say that:

$$E_1+E_2+E_3=1 \quad \text{Equation 6}$$

Equations 1, 2 and 3 are then substituted into equations 4 and 5. It can be shown that the chromaticity coordinates of the filter arrays can be expressed in terms of $E_1$ and $E_2$:

$$x(E_1,E_2)=x_0$$

$$y(E_1,E_2)=y_0$$

where $x_0$ and $y_0$ are the desired chromaticity coordinates of the ambient light. The Newton-Raphson method (discribed in "Numerical Regresion: The Art of Scientific Computing" by W. H. Press, B. P. Flannery, S. A. Peukoastky, and W. T. Vetterling, Cambrige University Press 1988) can be generalized in the 2D case as follows:

$$\begin{bmatrix} x_n - x_0 \\ y_n - y_0 \end{bmatrix} = \begin{bmatrix} \frac{\partial x_n}{\partial E_{1,n}} & \frac{\partial x_n}{\partial E_{2,n}} \\ \frac{\partial y_n}{\partial E_{1,n}} & \frac{\partial y_n}{\partial E_{2,n}} \end{bmatrix} \begin{bmatrix} E_{1,n} - E_{1,n+1} \\ E_{2,n} - E_{2,n+1} \end{bmatrix}$$

For the $n^{th}$ iteration, the partial derivitive $x_n$ and $y_n$ with respect to $E_{1,n}$ and $E_{2,n}$ are calculated numericly. This gives new values of $E_1$ and $E_2$ based on a first aproximation of $E_1$ and $E_2$. Inverting the matrix gives the next value of $E_1$ and $E_2$.

$$\begin{bmatrix} E_{1,n} - E_{1,n+1} \\ E_{2,n} - E_{2,n+1} \end{bmatrix} =$$

$$\frac{1}{\frac{\partial x_n}{\partial E_{1,n}} * \frac{\partial y_n}{\partial E_{2,n}} - \frac{\partial x_n}{\partial E_{2,n}} * \frac{\partial y_n}{\partial E_{1,n}}} \begin{bmatrix} \frac{\partial y_n}{\partial E_{2,n}} & -\frac{\partial y_n}{\partial E_{1,n}} \\ -\frac{\partial x_n}{\partial E_{2,n}} & \frac{\partial x_n}{\partial E_{1,n}} \end{bmatrix} \begin{bmatrix} x_n - x_0 \\ y_n - y_0 \end{bmatrix}$$

which is iterated until the total change in $E_1$ and $E_2$ is less than a predetermined error amount (for example 0.0001). The ratio of power for the filter arrays, calculated using the above method, gives a visual (or colorimetric) match between the filters' light and the ambient light. In most cases, this would be adequate for use as the strobe setting for a camera. Tailoring the calculations and resulting filter power ratios to the specific spectral sensitivity of the camera could achieve further improvement. In camera design, it is a goal to have the spectral sensitivities be a linear transformation of the color matching functions ($X(\lambda)$, $Y(\lambda)$, $Z(\lambda)$), but due to signal-to-noise and design constraints it is never precisely reached. It is desirable then to have the filtered strobe illumination match the signal received by a camera from the ambient light. This will give a color match as seen by the camera that will differ slightly from the match designed for a human observer (i.e. a colorimetric match). For a match as seen by the camera, the analysis is repeated as above except the color matching functions ($X(\lambda)$, $Y(\lambda)$, $Z(\lambda)$) are replaced with the camera specific spectral sensitivity functions. Using the camera spectral sensitivity functions will result in the correct power ratios for the filters that provide a match the color from the ambient light detected by the camera.

The power ratios created using the visual (or colorimetric) match calculated with the CIE color matching functions ($X(\lambda)$, $Y(\lambda)$, $Z(\lambda)$) result in a generic flash. The generic flash may be used interchangeably between cameras that have different spectral sensitivities. However, different CCD designs and/or different color filter pass bands can cause differences in spectral sensitivity between cameras. As a result, the power ratios created using a specific camera's spectral sensitivity functions would work best with the camera for which they were designed.

The method used above could also be used for determining the power ratio of two sources, for example a red and a blue filter. The method would also work with a broadband light source and a narrow band light source, for example a filter and the broadband source. With only two light sources, the light may not be able to exactly match the ambient source. In this case the two sources could be chosen to either maximize the number of ambient light sources that can be matched or to produce a very close match for a specific ambient light source. The form of the equation for a broadband light source B and a narrow band light source N would be as follows:

$$X=\int X(\lambda)(E_1 B(\lambda)+E_2 N(\lambda))d\lambda$$

where $B(\lambda)$ is the spectral power of the broadband light source and $N(\lambda)$ is the spectral power of the narrowband light source.

For an adjustable light source with 4 components, the power ratio between the 4 filters can be determined using well-known numerical methods.

The results of determining various power ratios for an auxiliary illuminating device would be a table or list of the correct power ratios for a number of ambient sources.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application, thereby enabling others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A light source with an adjustable color temperature, comprising:
    a broadband light source;
    at least one color filter having a first color;
    at least one color filter having a second color;
    the at least one color filter having the first color and the at least one color filter having the second color configured to allow light from the broad band light source to pass through the filters;
    at least one variable shutter configured to variably block the light passing through the at least one color filter having the first color;
    at least one variable shutter configured to variably block the light passing through the at least one color filter having the second color;
    a control system, the control system able to adjust the ratio of light passing through the color filter having the first color with respect to the color filter having the second color.

2. The light source of claim 1 where there is at least one area that allows the light from the broadband light source to pass through unfiltered.

3. The light source of claim 2 where there is at least one variable shutter configured to variably block the light passing through the unfiltered area.

4. The light source of claim 1 where the light source is configured to mount on a camera.

5. A light source with an adjustable color temperature, comprising:
    a broad band light source;
    at least one first color filter having a first color, the first color filter configured to allow light from the broad band light source to pass through the first color filter;
    at least one second color filter having a second color, the second color filter configured to allow light from the broad band light source to pass through the second color filter;
    at least one third color filter having a third color, the third color filter configured to allow light from the broad band light source to pass through the third color filter;
    at least one first variable shutter configured to variably block the light passing through the at least one first color filter having the first color;
    at least one second variable shutter configured to variably block the light passing through the at least one second color filter having the second color;
    at least one third variable shutter configured to variably block the light passing through the at least one third color filter having the third color;
    a control system, the control system able to adjust the ratio of light passing through the three color filters.

6. The light source of claim 5 where there is at least one area that allows the light from the broadband light source to pass through unfiltered.

7. The light source of claim 6 where there is at least one fourth variable shutter configured to variably block the light passing through the unfiltered area.

8. The light source of claim 5 further comprising:
    a fourth color filter, the fourth color filter transmitting light over a fourth wavelength band.

9. A light source with an adjustable color temperature, comprising:
    a broad band light source;
    a plurality of first color filters having a first color, the first color filters configured to allow light from the broad band light source to pass through the first color filters;
    a plurality of second color filters having a second color, the second color filters configured to allow light from the broad band light source to pass through the second color filters;
    a plurality of first shutters configured to block the light passing through the plurality of first color filters having the first color;
    a plurality of second shutters configured to block the light passing through the plurality of second color filters having the second color;
    a control system, the control system able to adjust the ratio of light passing through the first color filters having the first color with respect to the second color filters having the second color, by changing the number of color filters blocked by the shutters.

10. The light source of claim 9 where there is at least one area that allows the light from the broadband light source to pass through unfiltered.

11. The light source of claim 10 where there is at least one shutter configured to block the light passing through the unfiltered area.

12. A light source with an adjustable color temperature, comprising:
    a broad band light source;
    at least one first color filter having a first color, the first color filter configured to allow light from the broad band light source to pass through the first color filter;
    at least one second color filter having a second color, the second color filter configured to allow light from the broad band light source to pass through the second color filter;
    means for variably blocking the light passing through the at least one first color filter having the first color;
    means for variably blocking the light passing through the at least one second color filter having the second color;
    a control system, the control system able to adjust the ratio of light passing through the first color filter having the first color with respect to the second color filter having the second color.

* * * * *